Feb. 28, 1939.  W. J. BESLER  2,149,159
BRAKE MECHANISM FOR MOTOR VEHICLES
Filed Jan. 29, 1932  2 Sheets-Sheet 1
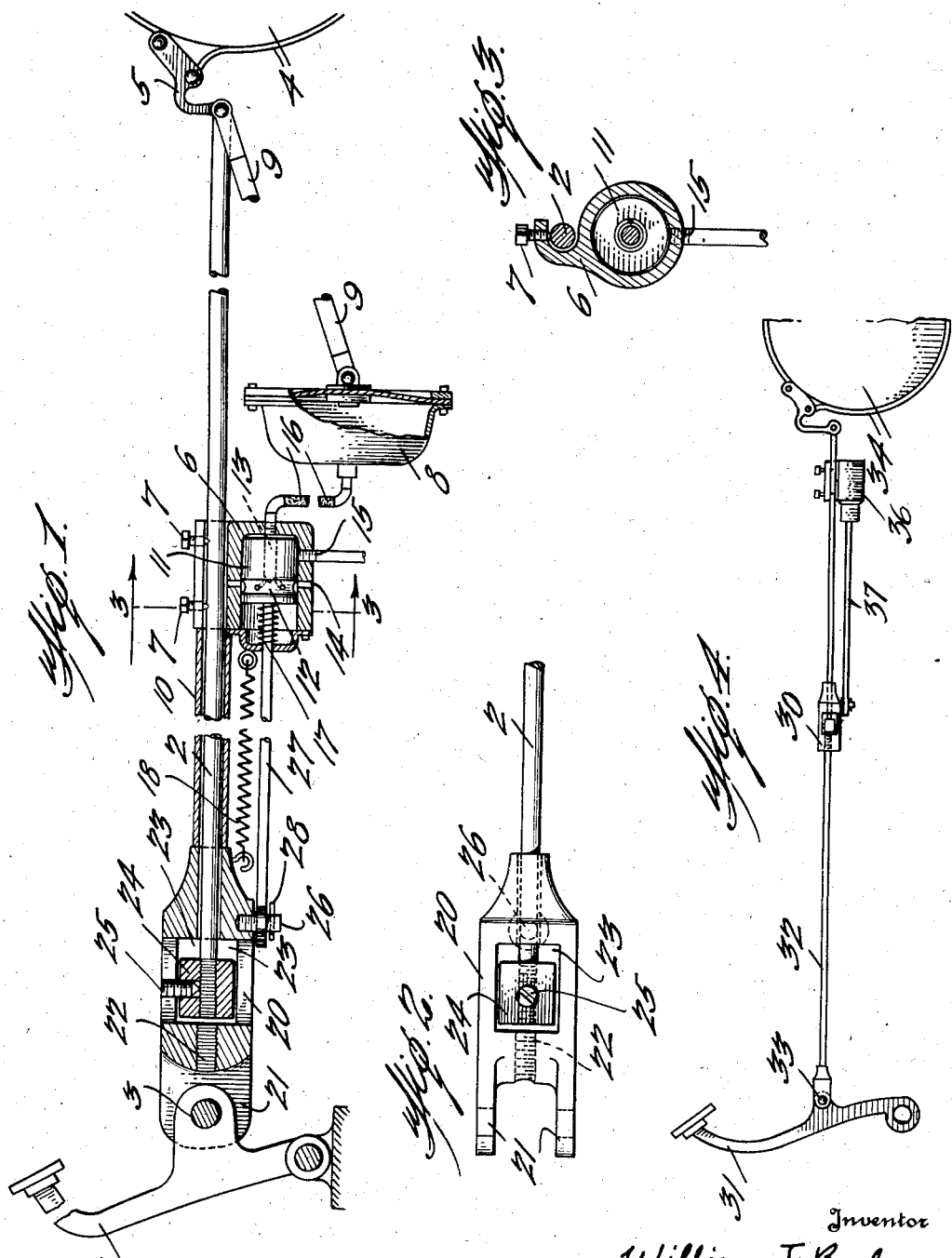
Inventor
William J. Besler
By Lee B. Kemon
his Attorney Feb. 28, 1939.   W. J. BESLER   2,149,159
BRAKE MECHANISM FOR MOTOR VEHICLES
Filed Jan. 29, 1932   2 Sheets-Sheet 2
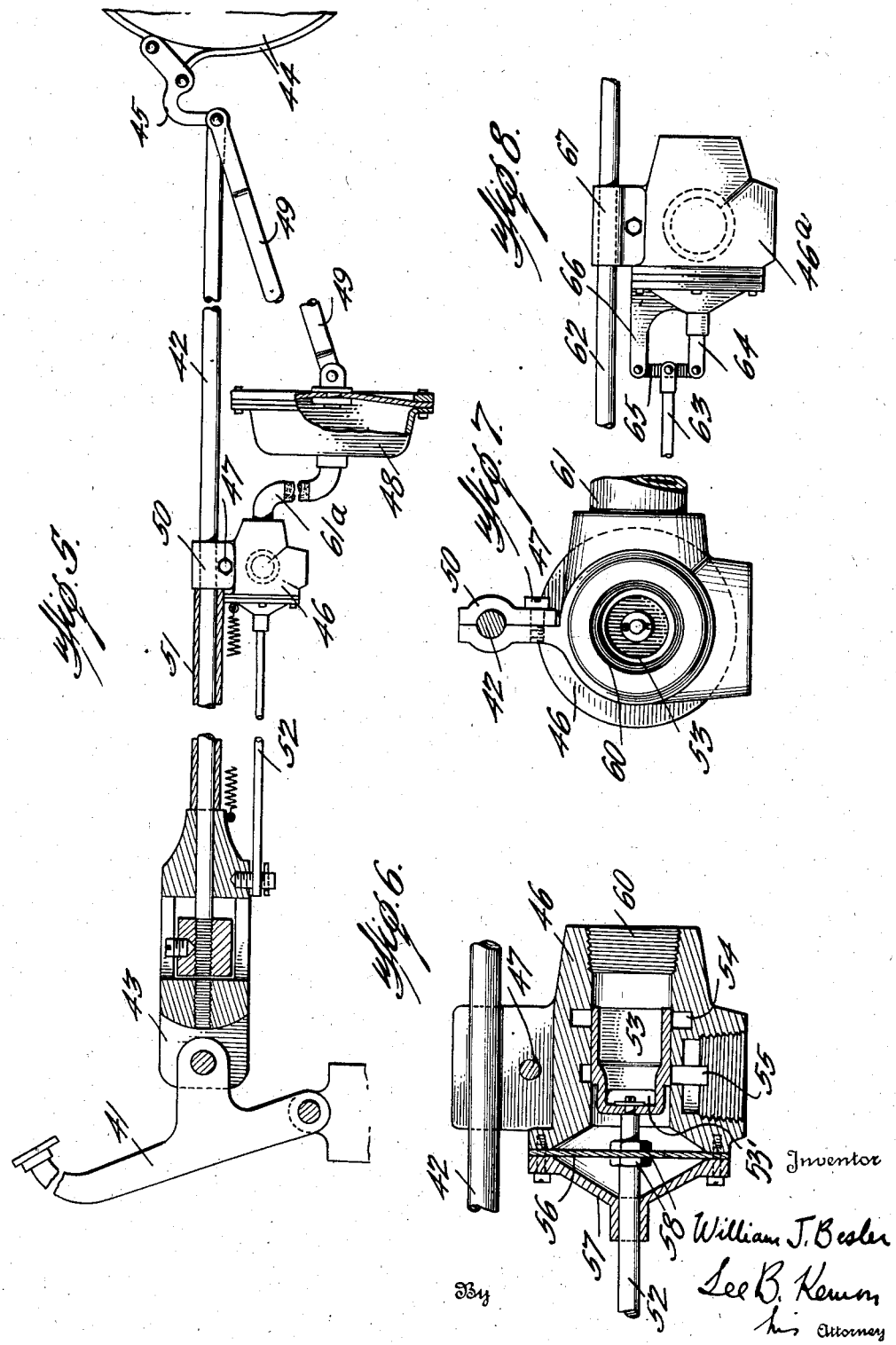

Patented Feb. 28, 1939

2,149,159

UNITED STATES PATENT OFFICE 2,149,159

BRAKE MECHANISM FOR MOTOR VEHICLES

William J. Besler, Plainfield, N. J.

Application January 29, 1932, Serial No. 589,701

13 Claims. (Cl. 188—152)

This invention relates to brake mechanism for motor vehicles and the like, and more particularly to brake mechanism of the servo-motor type such as that disclosed in my prior Patent No. 1,673,177, dated June 12, 1928, the present invention pertaining to an improvement upon the construction disclosed and claimed in said patent.

In the braking system shown in said patent, the control valve for the servo-motor is supported upon and moves with the usual operating rod extending from the pedal or operating lever to the brakes and, since no special mounting or support on the vehicle chassis for the valve is necessary, the installation of the valve upon a vehicle equipped with ordinary mechanical brakes is a relatively simple matter. While the apparatus referred to is particularly advantageous for converting a mechanical or manually controlled brake into a power or motor-controlled brake, the detailed construction also presented certain other advantages, particularly from the standpoint of simplicity and ruggedness, over similar systems used heretofore.

In general terms, the object of the present invention is to improve the construction of braking systems of the character described, both from the standpoint of general operating characteristics and the ease of installation and adjustment. In converting a manual braking system into a servo-motor system, the cost of the labor required to install the equipment amounts to a substantial proportion of the total cost, so that any modification of the system which reduces the labor of installation has considerable practical value.

In systems of the character described, wherein the operating lever or pedal is operatively connected to the control valve for the servo-motor and also connected to the brakes to provide for manual application thereof if necessary, a certain amount of play or lost motion is required between the lever or pedal and the brakes so that the control valve may be actuated by the lever or pedal to energize the servo-motor before manual application of the brakes occurs. A further object of my invention, therefore, is to provide an assembly fitting adapted to replace the usual brake-rod clevis, or, if desired, to be mounted elsewhere in the linkage extending to the brakes, said fitting providing for lost motion between the brake lever or pedal and the brakes and being connected to the control valve to actuate the same.

Other objects of the invention, including improvements in the construction of the fitting and valve and in the mounting and arrangement thereof, will appear from the following detailed description of the embodiments shown on the accompanying drawings, wherein Fig. 1 is a side view of a system embodying the invention showing the relationship of the assembly fitting and valve to a conventional brake pedal, operating rod, brake and fluid-pressure motor;

Fig. 2 is a plan view of the fitting shown in Fig. 1;

Fig. 3 is a cross-sectional view of the control valve taken on the line 3—3 of Fig. 1;

Fig. 4 is a view of a modification of Fig. 1 wherein the fitting is disposed intermediate the ends of the brake operating rod;

Fig. 5 is a view similar to Fig. 1 of a system embodying a modified form of control valve;

Figs. 6 and 7 are detail views of the valve shown in Fig. 5; and

Fig. 8 is a view of a modification of the braking system shown in Fig. 5.

Referring to the drawings, a braking system of the servo-motor type is shown embodying the usual brake pedal 1 and brake operating rod 2 secured to the pedal at the point 3 and adapted to control a friction brake 4 through the instrumentality of the lever element 5 in the usual manner. A control valve 6 is supported upon and carried by the operating rod 2, being secured thereto in any desired manner, as for example by the clamping bolts 7. The valve 6 is operative to control the vacuum drum or servo-motor 8, for example of the diaphragm type, which is connected by the rod or cable 9 to the element 5 to apply the brakes by power when the servo-motor is energized by the valve 6.

A spacing sleeve 10 which loosely encircles the operating rod 2 extends from the forward end of the rod to the casing of the valve 6. The valve 6 may be of any suitable construction but as shown preferably comprises a movable valve member 11 of the piston type which is adapted to slide back and forth in the cylindrical recess in the body portion of the valve 6 carried by the operating rod 2. The piston 11 is in air-tight engagement with the walls of said recess and is adapted to seal ports communicating with said recess in certain positions of the piston.

The piston 11 is provided with a circumferential groove 12 which is in communication through the internal passages 13 with the rearward portion of the recess in the valve 6. A port 14, open to the atmosphere, extends through the body portion of the valve adjacent the groove 12 when the piston 11 is in its rearward position as shown in Fig. 1. A port 15 extending through the body portion of the valve 6 is sealed when the piston 11 is in the position shown, but is adapted to be uncovered when the piston 11 moves forward to a position in which the port 14 is sealed.

The recess in the body portion of the valve 6 is connected by means of a pipe connection 16 to the pressure chamber of the servo-motor 8. The port 15 is adapted to be connected to a source of subatmospheric fluid pressure or suction, such as the intake manifold of the internal-combustion engine of the vehicle upon which the fluid-pressure system is mounted. It will be apparent that in the position of the piston 11 shown in Fig. 1, the vacuum chamber of the servo-motor 8 is connected through the port 14 to the atmosphere and the brakes are released. Upon a forward movement of the piston 11, relative to the body portion of the valve 6, the port 14 is sealed and a connection established through the port 15 to evacuate the vacuum chamber of the servo-motor 8, thereby applying the brakes. The piston 11 is normally urged towards the position shown by means of a spring 17 abutting against the end of the valve casing and the end of the piston 11. The spring 17 also causes the piston 11 to move to the position shown in event the connecting link 27 becomes deranged and fails to function, for example, if the link 27 breaks or becomes disconnected from fitting 20. Such valve actuation causes the fluid motor to be released and inoperative and thus prevents the brake from being set by uncontrollable operation of the fluid motor. The brake, of course, can be applied manually for controlling the vehicle when the fluid motor system is thus automatically cut out of operation on failure of the control link 27. The valve 6 is further connected by means of a tension spring 18 to the operating lever or brake pedal 1.

In order to facilitate the installation and adjustment of the control valve 6 upon the brake operating rod of a vehicle equipped with ordinary manual brakes, an assembly fitting 20 is provided which is substituted for the usual clevis between the operating rod 2 and brake pedal 1. The fitting 20 may be a casting of metal or other suitable material and, as shown more clearly in Fig. 2, is provided with projecting lugs 21 adapted to be secured to the brake pedal 1, as in the case of the ordinary clevis. The body portion of the fitting 20 is provided with a central longitudinal aperture, one end of which is threaded as indicated at 22 in order to permit the fitting 20 to be threaded upon the operating rod 2 at any point as will be described hereinafter, when it is inconvenient to substitute the fitting for the usual clevis.

The fitting 20 is further provided with a central transverse aperture 23 of sufficient size to accommodate a threaded member or nut 24 which is mounted upon a threaded portion of the operating rod 2. The nut 24 is preferably locked in the desired position by means of a locking screw 25 or equivalent means.

It will be apparent that the provision of the aperture 23 and member 24 mounted therein, as shown, permits manual application of the brake 4 by the pedal 1 and the operating rod 2 with a certain amount of lost motion between the pedal and the operating rod. In order that the control valve 6 may be operated before the brakes are manually applied, the fitting 20 is provided with a projecting lug or pin 26 which engages the forward end of a rod or link 27 connected to the valve piston 11. The rod or link 27 may be provided at its forward end with an aperture which is slipped over the pin 26 and held in position, for example, by means of a cotter-pin 28. With the described arrangement, it will be apparent that when the brake pedal 1 is depressed, the piston 11 will be moved forwardly to energize the servo-motor 8 before the lost motion in the fitting 20 is completely taken up. If, however, the servo-motor fails to function or to exert sufficient braking effort, application of the brakes is effected through the fitting 20 by the continued depression of the brake pedal 1.

It will also be apparent that the degree of application of the brake will depend upon the extent to which the brake pedal is depressed for the reason that a partial application of the brake through the servo-motor 8 causes the operating rod 2 to be carried forward by the operating or connecting rod 9 attached to the servo-motor, and the relative movement between the piston 11 and the casing of the valve 6, resulting from such movement of the rod 2, causes the ports 14 and 15 of the valve to be sealed until the brake pedal 1 is either further depressed or released. If the brake pedal is released, the piston 11 of the control valve 6 moves in a rearward direction, thereby connecting the servo-motor 8 to the atmospheric port 14 and releasing the brake.

A further feature of the described construction is embodied in the arrangement of the spring 17, as shown, so that it will be operative to take up any play, resulting from wear or other causes, between the pin 26 and valve operating link 27. The valve 6 preferably is designed with the minimum lap between the piston 11 and suction port 15 that will insure a negligible amount of leakage. The spring 17 takes up any lost motion between the pin 26 and link 27, thus maintaining the lap of the valve in the release position, as illustrated in Fig. 1, irrespective of the wear upon these parts in service.

As shown in Fig. 4 the fitting 30, which is of the same construction as the fitting 20 shown in Figs. 1 and 2, may be mounted intermediate the ends of the brake operating rod 32. In this modification the brake pedal 31 is connected through the operating rod 32 and the pivotal connection or clevis 33 to a brake 34. The rod 32 is cut at any desired point intermediate the ends, and the ends of the rod are threaded and screwed into the nut 24 and the threaded portion 22 of the fitting 30. The valve 36 corresponding to the valve 6 in Fig. 1 is supported upon the brake operating rod 32 and operatively connected to the fitting 30 by the rod or link 37 corresponding to the link 27 in Fig. 1. The operation of the system shown in Fig. 4 is the same as that described above in connection with Figs. 1–3, the valve 36 being connected to a source of fluid pressure and a servo-motor in the same manner as the valve 6 in the first modification. The valve 36 may be of any suitable construction, for example generally similar to that of the valve 6, with the movable valve member connected to the rod 37.

It will be apparent that with either modification, a vehicle equipped with ordinary manual brakes may be readily provided with controlling means for a power brake. In the first modification, the usual clevis between the brake pedal 1 and the brake operating rod 2 is removed and the fitting 20 mounted in its place, the nut 24 being threaded upon the end of the rod 20 and secured in desired position by the locking screw 25. The valve 6 and spacing sleeve 10 are disposed upon the rod 2 and the valve-operating rod 27 is attached to the pin 26 upon the fitting 20. The lengths of the sleeve 10 and rod 27 are such that a correct positioning of the valve 6 may be accurately assured even when the installation is made by unskilled labor. It is also evident that the sleeve 10 and spring 18 serve to position the valve 6 so that the system will remain in release and prevent the brakes from being unexpectedly applied even if the clamping bolts 7 which secure the valve to the supporting rod 2 become loosened.

As in the system disclosed in my prior patent above referred to, the follow-up of the valve resulting from the forward movement of the brake operating rod 2 when the motor 8 is energized permits the brake to be gradually applied and released, the extent of application corresponding to the extent to which the brake operating lever 1 is depressed after the play in the brake has been taken up; and the support of the valve 6 upon the brake operating rod not only accomplishes the follow-up function, but also obviates any necessity for a separate support for said valve which oftentimes involves considerable difficulty on account of the limited space available beneath the body or floor of the vehicle.

The control valve may be of modified construction without departing from the scope of the invention, as will be apparent from Figs. 5–8 of the drawings. In Fig. 5, a system is shown which is generally similar to that shown in Fig. 1 and comprises a brake pedal 41 connected through a brake operating rod 42 and assembly fitting 43 to the brake 44. A lever 45 corresponding to the lever 5 in Fig. 1 is provided between the rod 42 and the brake 44. A valve 46 is supported upon the rod 42, being clamped thereto by a clamping bolt 47, and is operative to control the energization of a fluid-pressure motor 48 connected to the lever 45 by a rod or cable 49. The clamping means for the valve 46 may embody a clamping plate 50 as shown more clearly in Fig. 7. A spacing sleeve 51 and valve-operating rod 52 are provided as in the system shown in Fig. 1.

The detailed construction of the valve 46 is shown in Figs. 6 and 7. The valve comprises a hollow movable valve member or piston 53 secured to the valve-operating rod 52 and adapted to reciprocate in a cylindrical recess in the body portion of the valve. The piston 53 cooperates with ports 54 and 55 extending through the wall of the valve and is adapted to seal either or both of said ports depending upon the position thereof. The port 54 communicates with the source of fluid pressure or suction through a pipe connection 61 and the port 55 is open to the atmosphere.

A diaphragm 56 clamped between the body portion of the valve and an end cap 57 serves to position the piston 53 under normal conditions, the valve operating rod 52 being secured to said diaphragm by the clamping nuts 58. The valve connection 60 is in communication by pipe 61a with the pressure chamber of the servo-motor 48. The installation and operation of the system shown in Figs. 5–7 are the same as in the case of the modification shown in Figs. 1–3 and further description thereof is deemed unnecessary.

It will be noted that the aperture 53' in valve member 53 causes the right-hand side of the diaphragm 56, as viewed in Figure 6, to be subjected to the pressure existing in the pressure chamber of the servo-motor 48. Thus, if a reduced pressure exists in said chamber due to leakage in the valve or operation thereof by the operating pedal 41, the unbalanced pressures upon the opposite sides of the diaphragm 56, aided by the resiliency of the diaphragm, tends to move the valve member 53 in such a direction as to lap the suction port 54 and to crack the atmospheric port 55 for releasing the brakes when the operating pedal is not depressed.

The connection of the valve-operating rod to the valve may be modified if desired, as it is sometimes advantageous to reduce to the minimum the pedal travel to produce full port openings. Thus, as shown in Fig. 8, a valve 46a corresponding to the valve 46 shown in Figs. 5–7 and supported upon a brake operating rod 62 at the point 67 is attached to a valve-operating rod 63 by means of a rod 64 corresponding to the rod 52 and a pivoted link 65 carried by a projecting lug or arm 66 on the body portion of the valve. By this arrangement, the lost motion in the pedal 41 can be reduced as desired and the weight of the valve-operating rod carried by the lug 66 and the tendency for binding of the piston rod 64 decreased.

Various other modifications of the systems described above will occur to those skilled in the art and are intended to come within the scope of the present invention if within the scope of the appended claims.

I claim:

1. In a brake mechanism for motor vehicles, a brake, a system of connected elements which includes an operating lever and an operating rod connected to said lever for manually applying the brake, a fluid-pressure motor for operating the brake and having an operative connection therewith, a valve for controlling the operation of said motor, a fitting for controlling said valve in accordance with the adjustment of said operating lever and operatively connected to said lever and a link connecting said fitting and said valve, said fitting comprising a body portion having projecting lugs at one end thereof adapted to be secured to the operating lever and further provided with an aperture at said one end adapted to receive said operating rod whereby the fitting may be secured either directly to said lever or to said rod, as desired, said body portion of the fitting having an integral extension adapted to engage said operating rod to apply the brake manually when said operating lever is moved.

2. In a brake mechanism for motor vehicles, a brake, a system of connected elements which includes an operating lever and an operating rod connected to said lever for manually applying the brake, a fluid-pressure motor for operating the brake and having an operative connection therewith, a valve for controlling the operation of said motor, a fitting for controlling said valve in accordance with the adjustment of said operating lever and operatively connected to said lever and a link connecting said fitting and said valve, said fitting comprising a body portion having projecting lugs at one end thereof adapted to be secured to the operating lever and further provided with an aperture at said one end adapted to receive said operating rod whereby the fitting may be secured either directly to said lever or to said rod, as desired, and means including said fitting for providing lost motion between said operating lever and the brake.

3. In a brake mechanism for motor vehicles, a brake, a system of connected elements which includes an operating lever and an operating rod connected to said lever for manually applying the brake, a fluid-pressure motor for operating the brake and having an operative connection therewith, a valve for controlling the operation of said motor, a fitting for controlling said valve in accordance with the adjustment of said operating lever and operatively connected to said lever and a link connecting said fitting and said valve, said fitting comprising a body portion having projecting lugs adapted to be secured to the operating lever and further provided with an aperture opposite said lugs adapted to serve as a guide for one end of the operating rod which projects into said fitting.

4. In a brake mechanism for motor vehicles, a brake, a system of connected elements which includes an operating lever and an operating rod connected to said lever for manually applying the brake, a fitting between the operating lever and the brake providing lost motion therebetween, a fluid-pressure motor for operating the brake and having an operative connection therewith, a valve for controlling the operation of said motor, said valve being supported upon the operating rod, means for actuating said valve upon movement of the operating lever and a positioning element for the valve extending from said valve to said fitting.

5. In a brake mechanism for motor vehicles, a brake, a system of connected elements which includes an operating lever and an operating rod connected to said lever for manually applying the brake, a fluid-pressure motor for operating the brake and having an operative connection therewith, a valve for controlling the operation of said motor, said valve being supported upon the operating rod, a positioning sleeve on said rod engaging the valve and resilient means for holding said valve and said sleeve in engagement.

6. In a brake mechanism for motor vehicles, a brake, a system of connected elements which includes an operating lever and an operating rod connected to said lever for manually applying the brake, a fluid-pressure motor for operating the brake and having an operative connection therewith, a valve for controlling the operation of said motor, said valve being supported upon the operating rod, a fitting adapted to provide a lost-motion connection between the operating lever and operating rod, a positioning sleeve for the valve mounted on said operating rod between said fitting and said valve, and a tension spring secured at its opposite ends to said fitting and said valve.

7. In a brake mechanism for motor vehicles, a brake, a system of connected elements which includes an operating lever and an operating rod connected to said lever for manually applying the brake, means connected with said rod for providing lost-motion between said operating lever and said brake, a fluid-pressure motor for operating the brake and having an operative connection therewith, a valve for controlling said motor embodying a valve casing supported upon the operating rod and movable therewith and a valve member in said casing movable longitudinally of said rod, means including a link connected to said first-mentioned means for moving said valve member relative to the casing to operate the valve by the movement of said operating lever before the lost motion is taken up and a flexible diaphragm responsive to fluid-pressure conditions within said motor for normally positioning the movable valve member relative to the casing and operating rod.

8. In a brake mechanism for motor vehicles, a brake, a system of connected elements which include an operating lever, an operating rod connected to said lever for manually applying the brake, a fluid pressure motor for operating the brake and having an operative connection therewith, a valve for controlling the operation of said motor, said valve being supported upon said operating rod, a connecting member between said operating lever and said valve for actuating said valve, and resilient means connected to said valve for operating said valve for releasing fluid motor operation of the brake when said connecting member becomes deranged.

9. In a brake mechanism for motor vehicles, a brake, a system of connected elements which include an operating lever, an operating rod connected to said lever for manually applying the brake, a fluid pressure motor for operating the brake and having an operative connection therewith, a valve for controlling the operation of said motor, said valve being supported upon said operating rod, a connecting member between said operating lever and said valve for actuating said valve, and a spring connected to said valve for actuating said valve to release said fluid pressure motor and permit manual application of said brake in event said connecting member fails to function.

10. In a brake mechanism for motor vehicles, a brake, a system of connected elements which includes an operating lever and an operating rod connected to said lever for manually applying the brake, a fluid-pressure motor for operating the brake and having an operative connection therewith, a valve for controlling the operation of said motor, said valve being supported upon the operating rod, a fitting adapted to provide a lost-motion connection between the operating lever and operating rod, a positioning sleeve for the valve mounted on said operating rod between said fitting and said valve, a tension spring secured at its opposite ends to said fitting and said valve, a valve operating link arranged to move with said operating lever, and means for actuating said valve to release said fluid pressure motor in event said valve operating link fails to function.

11. In a brake mechanism for motor vehicles, a brake, a system of connected elements which include an operative lever, an operating rod connected to said lever for manually applying the brake, a fluid-pressure motor for operating the brake and having an operative connection therewith, a valve for controlling the operation of said motor, said valve comprising a hollow body portion clamped to said operating rod and a movable valve member therein, the interior of the body portion of said valve being in communication with said motor, a flexible diaphragm closing one end of the body portion of said valve to be subjected to the pressures obtaining in said fluid-pressure motor and secured to said movable valve member whereby said valve member is moved by flexure of said diaphragm in either direction from its normal position and a connecting member between said operating lever and said movable valve member whereby the valve is conjointly controlled by said operating lever and said diaphragm.

12. In a brake mechanism for motor vehicles, a system of connected elements which includes a brake, an operating rod for manually applying the brake, a lost-motion fitting, and an operating lever, a driving connection at the center of one end of said fitting between the latter and said rod providing for limited lost-motion therebetween, means at the center of the other end of said fitting for securing the latter to said lever at a point in line with said rod whereby force may be transmitted directly and in a straight line from said lever to said brake, a fluid-pressure motor for operating the brake and having an operative connection therewith, a valve for controlling the operation of said motor, said valve being supported upon the brake operating rod, and a valve operating rod connected to said fitting, whereby said valve is controlled in accordance with the movement of said fitting.

13. In a brake mechanism for motor vehicles, a system of connected elements which includes an operating lever, an operating rod for manually applying the brake, a detachable fitting, means at one end of said fitting for receiving the free end of said rod therein, said fitting and rod having coacting means for providing a driving connection with limited lost motion therebetween, pivotal means at the other end of said fitting for securing the latter to said lever at a point in line with said rod whereby force may be transmitted directly and in a straight line from said lever to said brake, a fluid-pressure motor for operating the brake and having an operative connection therewith and a valve for controlling the operation of said motor, said valve being supported upon the operating rod and embodying relatively movable valve members, means for securing one of said members to the operating rod, and means connecting the other of said members to said fitting, whereby initial movement of said lever in the direction to apply the brake will operate the valve to energize the fluid-pressure motor before taking up the lost motion in said fitting.

WILLIAM J. BESLER.